United States Patent [19]

Henshaw

[11] Patent Number: 4,508,431
[45] Date of Patent: Apr. 2, 1985

[54] PHOTOREFRACTIVE LASER BEAMSTEERING DEVICE

[75] Inventor: Philip D. Henshaw, Carlisle, Mass.

[73] Assignee: Massachusetts Institute of Technology, Cambridge, Mass.

[21] Appl. No.: 338,466

[22] Filed: Jan. 11, 1982

[51] Int. Cl.³ .............................................. G02F 1/29
[52] U.S. Cl. .................................... 350/354; 350/355
[58] Field of Search ................... 350/354, 355, 162.17, 350/162.20, 484

[56] References Cited

U.S. PATENT DOCUMENTS 3,539,244  11/1970  Marks ................................. 350/353
3,790,252  2/1974   Pao ..................................... 350/354

Primary Examiner—Bruce Y. Arnold
Attorney, Agent, or Firm—Arthur A. Smith, Jr.; Thomas J. Engellenner

[57] ABSTRACT

Apparatus for steering a principal beam of electromagnetic radiation consisting of a photorefractive material situated such that the principal beam of radiation passes therethrough, the material being photoconductive and having an index of refraction that is variable in response to transverse electro-optical effects; and variable writing means for irradiating the material in a direction orthogonal to the principal beam with two beams which intersect at a variable angle so as to write a diffraction grating in the material and thereby vary the index of refraction of the material, thus steering the principal beam.

16 Claims, 4 Drawing Figures

PHOTOREFRACTIVE LASER BEAMSTEERING DEVICE

The U.S. Government has rights in this invention pursuant to Defense Department Contract No. F19628-80-C-0002.

TECHNICAL FIELD This invention relates to laser beamsteering devices and, particularly, beamsteering devices based on the photorefractive effect and capable of yielding a wide field-of-view and a large number of beam positions.

BACKGROUND OF THE INVENTION

Attention is directed to a paper by the applicant entitled "Laser Deflection Using The Photorefractive Effect" published by the Massachusetts Institute of Technology Lincoln Laboratory (Jan. 12, 1981), wherein some of the applicant's work is described, hereby incorporated by reference.

Interest in the use of lasers for radar, optical display systems, optical memory and retrieval systems has prompted a search into more effective and efficient beamsteering devices. Such devices can be divided into two main categories, those which provide analog deflection and those which provide digital deflection. The first type of analog deflection is provided by source motion. A point source of laser light placed in the focal plane of a lens will produce a collimated laser beam which varies in direction as the point source is moved. These devices have the advantage of being easily controlled and two dimensional deflection can be produced. These devices, however, are limited by the fact that the laser source be compact enough to function at a point source. This limits the laser device to low-power. The second type of analog device overcomes the point source limitation by tilting the entire wavefront from a lasing medium using a phased array or grating. A fundamental difficulty in this technique is that the multiple diffraction orders produced by such phase gratings limit the efficiency of these devices to about 40%. This limitation on efficiency can be overcome if Bragg's law is satisfied using a thick grating. Acousto-optic devices are presently in use for a number of commercial purposes employing such thick gratings, for example, U.S. Pat. No. 3,860,752 issued to Adler et al on Jan. 14, 1975 disclosing an acousto-optic beamsteering device.

The second main type of beamsteering device can be characterized by digital deflection rather than analog deflection. There are at least three different types of digital deflectors. The first operates on the principle of polarization modulation, and makes use of a polarizing beamsplitter to direct beams into one of two directions depending upon the polarization of the beam. Such schemes are inherently binary, and all presently known methods of modulating and separating different polarizations have limited fields-of-view. However, these devices can operate at very high speeds. The second method of digital deflection makes use of the principle of total internal reflection. These devices operate by changing the critical angle of an interface slightly, thus either transmitting or reflecting an incident beam. Again, these switches are inherently binary. Since the beam must be incident on an interface near the critical angle a substrate much larger than the beam diameter is required. This also tends to limit the field-of-view if the critical angle is large. The third method of digital switching is based on the use of interferometers. By changing the path length difference in an interferometer, the resulting constructive or destructive interference can be used to switch a beam from one output to another. The number of potential outputs is equal to the finesse of the interferometer, which in the case of a Fabry-Perot etalon can be larger than two. Furthermore, if the path length change compensates for the angle of the beam going through the device, the limitation on the field-of-view can be relaxed. All the above digital schemes can be cascaded in order to produce larger numbers of beam positions, however, when large numbers of beam positions are required the transmission of each stage must be very near unity in order to avoid unacceptable losses in the beamsteering system.

Aside from beamsteering devices, it is generally known that the photorefractive effect is a bulk phenomenon occurring in certain single crystal materials such as lithium niobate, zinc selenide, bismuth silicon oxide and bismuth germanium oxide. These materials have both photoconductive and electro/optic properties. Briefly, the mechanism involves the creation of photoelectrons by incident short wavelength radiation ($\approx$5000 Å). These electrons move under the influence of an applied bias voltage to regions of low intensity in the crystal, where they are trapped. This creates a strong internal electric field which modulates the index of refraction of the material through a transverse electro-optic effect. I am not aware of any prior art device employing photorefractive materials to steer a laser beam in a random access fashion.

There exists a need in connection with laser radar, optical displays, memory and retrieval systems for a beamsteering device with high efficiency and a wide field-of-view, which can produce up to several thousand beam positions or more with rapid steering (i.e. less than one millisec). It would also be preferrable to have a beamsteering device for a high power laser beam which can be controlled by a relatively low power, agile, control beam, thus permitting all-optical steering.

SUMMARY OF THE INVENTION

I have discovered a new analog method of beamsteering employing a photorefractive material and a laser means, which creates a phase grating in the crystal material. In my preferred embodiment two writing beams are created and used to steer a longer wavelength beam. The two writing beams are incident from one side of the crystal and fill the entire volume of the crystal with a sinusoidally varying intensity. The two beams should be coherent in order to form an interference pattern. The beam to be steered enters the crystal through a face, perpendicular to the writing beams, and is deflected by the grating formed in the bulk of the material. By changing the direction of the writing beams, both the spatial frequency and orientation of the phase grating can be varied such that Bragg's law is always satisfied. This device thus changes the problem of steering the high intensity, long wavelength beam to one of steering the lower power, short wavelength beam.

The writing beams must satisfy several requirements. They must be at a wavelength to which the photorefractive material is sensitive, near 5000 Å. They must be coherent with respect to one another, and have a narrow spectrum, since the number of interference fringes which can be generated is on the order of $\lambda/\Delta\lambda$. Finally, they must be agile and have sufficient power to write a grating in the photorefractive crystal in a time less than a millisecond. One laser and optical system which can generate two beams meeting these requirements is an e-beam controlled scanlaser which makes use of a longitudinally pumped CdS semiconductor laser. The coherence is provided by either a Fabry-Perot cavity or distributed feedback (DFB) structure incorporated into the CdS wafer-substrate assembly.

One optical system I have designed consists of a first lens which collimates the beam and passes it through a beamsplitter, producing two symmetrically steered, collimated beams, and a second set of lenses which act as relay optics to insure that the beams will always interfere in the region occupied by the photorefractive crystal. This optical arrangement provides the writing beams necessary to steer the beam in one direction. A second system is then required to produce the orthogonal steering. In another embodiment a compact optical system can be formed using a special lens, having half its area coated with an anti-reflection film and the other half being 50 percent transmissive. Such a lens can create a virtual source without the need for a separate beamsplitter and focus the two beams on the photorefractive crystal simultaneously.

Materials which exhibit photorefractive properties and which can be useful in a photorefractive beamsteering devices include single crystal materials such as lithium niobate, zinc selenide, bismuth germanium oxide (BGO) and bismuth silicon oxide (BSO) as well as composite crystals such as potassium tantalum niobate (KTN) and strontium barium niobate (SBN). Non-crystalline materials, which may also exhibit a similar effect, include transparent refracting microspheres in suspension and organic dye molecules.

My invention will next be described in connection with certain preferred embodiments. However, it should be obvious to those skilled in the art that various changes and modifications can be made without departing from the spirit and scope of my invention. For example, various other methods can be used to create a moving source for my writing beams. More than one actual source can be employed to create the writing beams, and hence the diffraction pattern, but with two or more sources coherence becomes an important consideration. Additionally, a bias field or other means may be employed to enhance the photorefractive effect.

DETAILED DESCRIPTION OF THE PREFERRED EMBODIMENT

Figure 1:
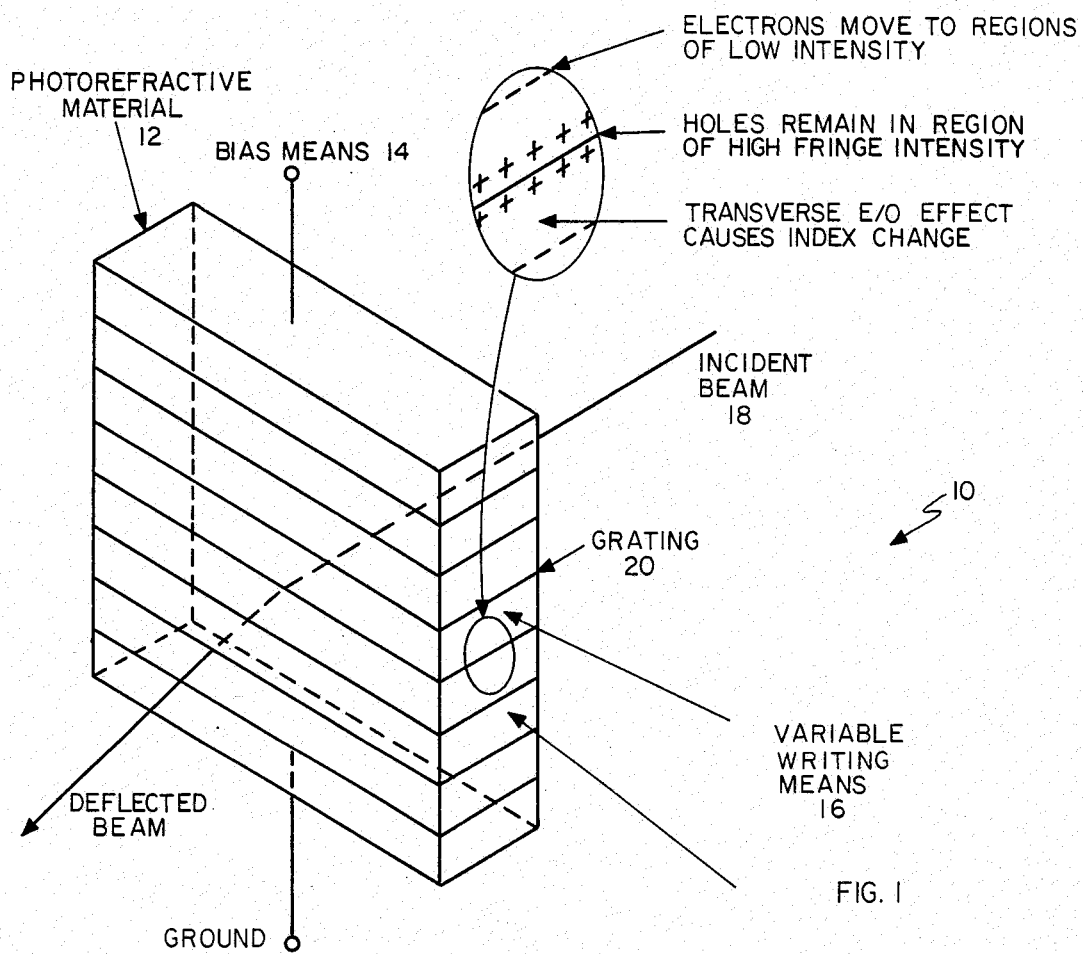
FIG. 1 is a schematic diagram of my beamsteering device.

In FIG. 1 the principle of photorefractive beam-steering is illustrated. My basic device 10 consists of a block of photorefractive material 12, which has the property that an index of refraction change can be induced in response to relatively low intensity light of certain wavelengths. This material is in the form of a rectangular block with at least three faces polished. The beam to be deflected 18 propagates from the upper right to the lower left in FIG. 1. A variable writing means 16 consisting of two interfering writing beams is incident from the side of the block 12 and propagates roughly perpendicular to the beam to be deflected. The writing beams 16 are supplied by a laser which has sufficient coherence to produce an interference pattern 20 throughout the volume occupied by the photorefractive material, and they are at a wavelength to which the photorefractive material is sensitive. Bias means 14 applies a bias voltage perpendicular to the planes of the interference pattern. This caused a volume grating to be formed in the material, which is used to deflect the incident beam. The spacing and tilt of the grating planes is varied by changing the direction of the writing beams.

Figure 2:
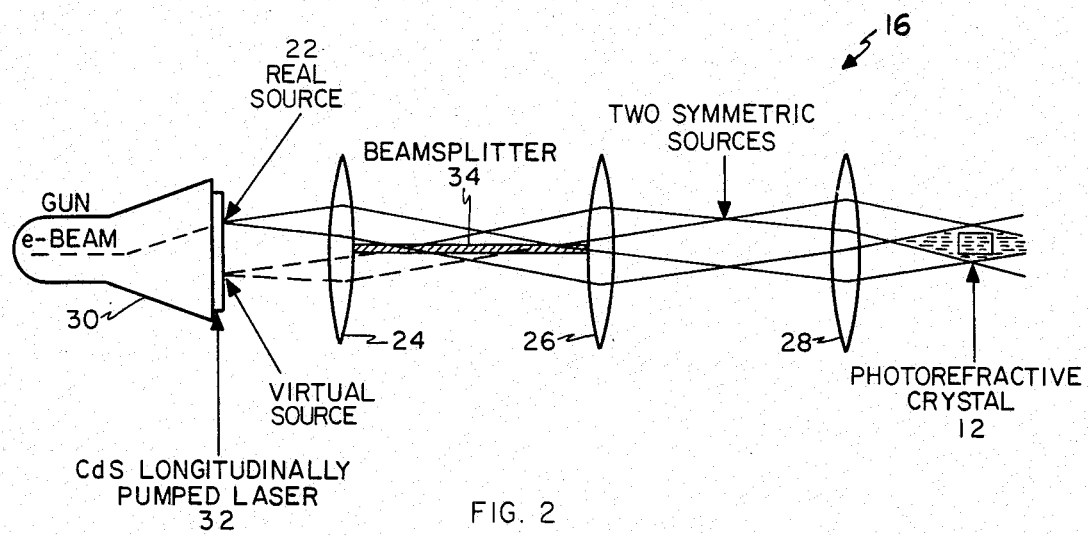
FIG. 2 is a schematic diagram of a variable writing means for the device of FIG. 1.

In FIG. 2 one variable writing means is shown to generate the required low power writing beams using a scan laser, based on the moving source method. An electron beam gun 30 is incident from the left onto a CdS wafer 32. This wafer emits blue-green laser light in response to an e-beam excitation, and by changing the location where the e-beam strikes the wafer a moving source can be created in the focal plane of the first lens 24. This lens 24 directs the radiation to a beam-splitter 34 which produces a virtual source indicated by the dotted rays. The second and third lenses 26 and 28 act as relay optics to direct the beam to the photo refractive crystal 12, shown on the right. This crystal 12, bismuth silicon oxide in our experiments, can respond to the blue-green light produced by the CdS laser.

Figure 3:
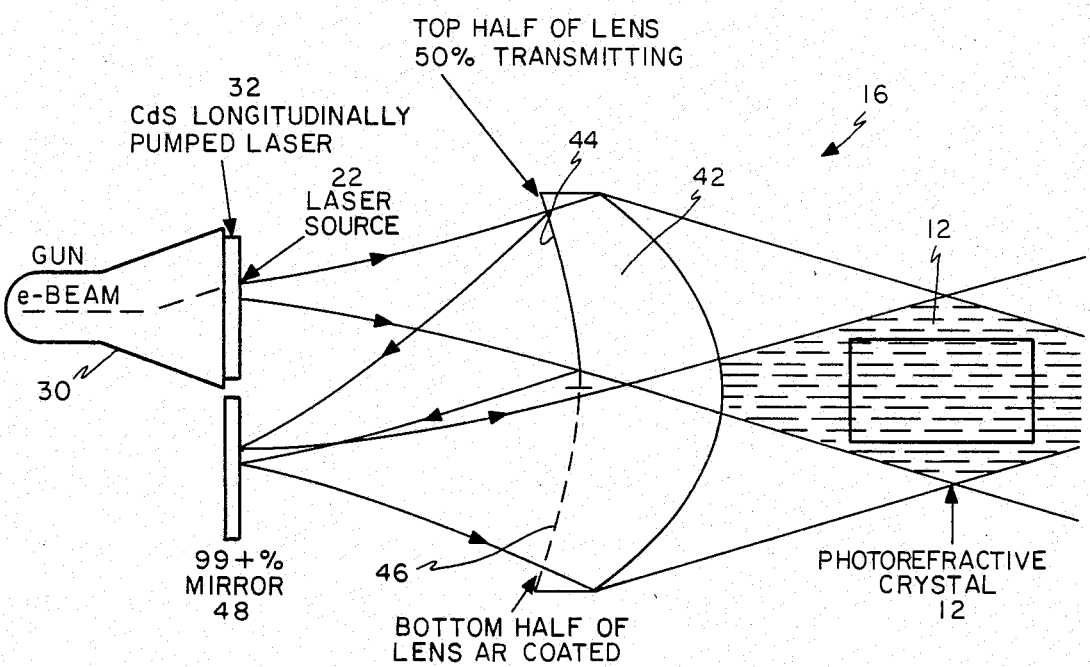
FIG. 3 is a schematic diagram for an alternative variable writing means for the device of FIG. 1.

FIG. 3 shows a more compact and elegant way to generate two interfering beams 16. Again, a CdS pumped laser 32 is excited by e-beam gun 30 to generate the writing beams. Now, however, a special piece of optics 42 and mirror 48 are used to create the virtual source and collimate the beams simultaneously. One face of lens 42 has a bottom half 46 which is anti-reflection coated and a top half 44 which is 50% transmissive.

Figure 4:
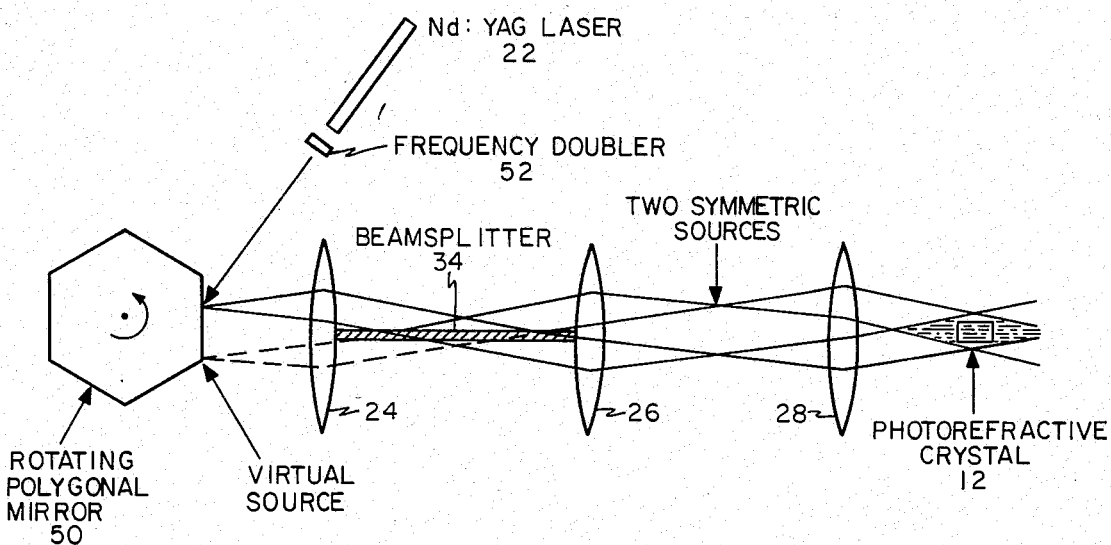
FIG. 4 is a schematic diagram for an alternative moving source for the writing means of FIG. 2.

In FIG. 4 another alternative method of generating writing beams is shown. The source could be a pulsed frequency-doubled Nd:YAG laser 22 with a pulse length of 10 nsec and a triggered pulse. The writing beam change would be generated by a rotating polygonal mirror 50 and the direction of the writing beam would be controlled by the timing of the laser pulse relative to the polygonal mirror position. Frequency doubler 52 serves to double the frequency of the laser 22.

I have conducted experiments to test the principle of photorefractive beamsteering in bismuth silicon oxide. In my experiment an Argon-ion laser and a Michelson interferometer were used to generate and control the writing beams. The experimental photorefractive device was constructed from a 1-cm cube of bismuth silicon oxide. A bias voltage varying between 0 and 11.6 kV was applied along the 110 direction using silver paint electrodes. The writing beams were along the 001 axis. The beam to be steered propagated along the 110 direction. The entire crystal assembly was immersed in Dow-Corning 200 silicone oil to prevent electrical breakdown across the face of the crystal.

The diffraction efficiency was determined for a bias voltage varying between 0 and 11.6 kV as measured across the crystal by a high voltage probe. The writing beams were supplied by an Argon-ion laser which produced 1.1 watts at 5145 Å. A shutter was used to provide an exposure time of 10 msec, in order to simulate pulsed exposure of the crystal. The He-Ne readout beam was circularly polarized to achieve the best efficiency. First order deflection angles from 5 to 30 degrees, switching times of less than one millisecond and a maximum efficiency of 21% at 11.6 kV were measured. The diffraction efficiency had a quadratic behavior with applied voltage.

What I claim is:

1. Apparatus for steering a principal beam of electromagnetic radiation comprising:
   A. a photorefractive material situated such that said principal beam passes therethrough, said photorefractive material being photoconductive and having an index of refraction that is variable in response to transverse electro-optical effects, and
   B. variable writing means for irradiating said photorefractive material with at least two beams which intersect one another and which are each transverse to the principal beam so as to write a diffraction grating in said photorefractive material and thereby vary the index of refraction of said photorefractive material, wherein the angle at which said two beams intersect is variable such that for a desired angle of deflection said diffraction grating is formed at about an angle set by Bragg's law so as to optimize steering efficiency.

2. The apparatus of claim 1 wherein the apparatus further comprises bias means for applying a voltage across said photorefractive material and thereby making photoconduction in said photorefractive material more rapid.

3. The apparatus of claim 1 wherein the variable writing means further comprises:
   A. An array of lasing media,
   B. selector means for separately activating each lasing medium so as to produce coherent radiation,
   C. beam splitting means orthogonal to said array, for splitting the radiation from any one of the lasing media into a first and second writing beam,
   D. lens means for collimating and focusing the split beams to interfere in the photorefractive material, whereby diffraction gratings of different periods can be formed by selecting a particular lasing medium from the array.

4. The apparatus of claim 3 wherein said array is an array of discrete lasing materials.

5. The apparatus of claim 3 wherein said array is a continuous stripe of lasing material, particular regions of which are capable of emitting radiation when activated by the selector means.

6. The apparatus of claim 4 wherein the selector means comprises an electromagnetically controlled electron beam whereby a variable electromagnetic field is employed to deflect an electron beam onto a particular medium and to thereby induce lasing.

7. The apparatus of claim 5 where the selector means comprises an electromagnetically controlled electron beam whereby a variable electromagnetic field is employed to deflect an electron beam onto a particular medium and to thereby induce lasing.

8. The apparatus of claim 3 wherein the lasing media are cadmium sulfide semiconductors.

9. The apparatus of claim 2 wherein said principal beam is a high-power, long-wavelength laser beam and the first and second writing beams are low-power, short wavelength laser beams.

10. The apparatus of claim 1 wherein the variable writing means further comprises:
    A. a rotatable polygon with mirrored sides,
    B. a source of variable frequency, pulsed radiation directed upon the polygon,
    C. beam splitting means orthogonal to the axis of rotation of the polygon; for splitting the radiation reflected from the polygon into a first and second writing beam, and
    D. lens means for collimating and focusing the split beams to interfere in the photorefractive material, whereby the diffraction gratings of different periods can be formed by timing of the laser pulse relative to the polygonal mirror position.

11. The apparatus of claim 1 wherein said photorefractive material is bismuth silicon oxide.

12. The apparatus of claim 1 wherein said photorefractive material is bismuth germanium oxide.

13. The apparatus of claim 1 wherein said photorefractive material is lithium niobate.

14. The apparatus of claim 1 wherein said photorefractive material is zinc selenide.

15. The apparatus of claim 1 wherein said photorefractive material is potassium tantalum niobate.

16. The apparatus of claim 1 wherein said photorefractive material is strontium barium niobate.

* * * * *